United States Patent

Zhevelev et al.

[11] Patent Number: 5,973,996
[45] Date of Patent: Oct. 26, 1999

[54] ULTRASOUND INTRUSION DETECTOR

[75] Inventors: Boris Zhevelev, Rishon le Zion; Mark Moldavsky, Petach Tikva, both of Israel

[73] Assignee: Visonic Ltd., Tel Aviv, Israel

[21] Appl. No.: 09/064,582

[22] Filed: Apr. 22, 1998

[30] Foreign Application Priority Data

Jun. 12, 1997 [IL] Israel .......................................... 121068

[51] Int. Cl.⁶ .................................................. G01S 15/00
[52] U.S. Cl. .................................................. 367/99
[58] Field of Search ................................. 367/99, 98, 94, 367/93

[56] References Cited

U.S. PATENT DOCUMENTS

| | | | |
|---|---|---|---|
| 4,003,045 | 1/1977 | Stockdale | 367/94 |
| 4,035,798 | 7/1977 | Hackett | 367/93 |
| 4,319,349 | 3/1982 | Hackett | 367/136 |
| 4,382,291 | 5/1983 | Nakauchi | 367/93 |
| 4,499,564 | 2/1985 | Sirai | 367/93 |
| 4,512,000 | 4/1985 | Masuko | 367/93 |
| 4,608,674 | 8/1986 | Guscott | 367/93 |
| 4,625,199 | 11/1986 | Pantus | 367/94 |
| 4,639,902 | 1/1987 | Leverance et al. | 367/93 |
| 4,755,973 | 7/1988 | Meier et al. | 367/93 |
| 4,910,717 | 3/1990 | Terry | 367/99 |
| 4,918,672 | 4/1990 | Iwabuchi et al. | 367/99 |
| 4,991,146 | 2/1991 | Ransdell et al. | 367/98 |
| 5,677,666 | 10/1997 | Stallbohm | 367/93 |
| 5,760,687 | 6/1998 | Cousy | 367/93 |

FOREIGN PATENT DOCUMENTS

| | | |
|---|---|---|
| 0 188 165 | 7/1986 | European Pat. Off. . |
| 0 473 835 | 3/1992 | European Pat. Off. . |
| 2 115 151 | 9/1983 | United Kingdom . |
| 2 279 748 | 1/1995 | United Kingdom . |

*Primary Examiner*—Daniel T. Pihulic
*Attorney, Agent, or Firm*—Darby & Darby

[57] ABSTRACT

This invention discloses a method for detecting the presence of a moving object in a detection area, including emitting a sequence of bursts of ultrasonic energy into the area, receiving ultrasonic energy reflected from within the detection area, in response to the sequence of bursts, and generating a sequence of signals respectively responsive thereto, comparing each signal in the sequence with a preceding signal, to find a variation in the signals over the sequence of bursts, and analyzing the variation in the signals to determine the presence of the moving object. Apparatus for detecting the presence of a moving object in a detection area is also disclosed.

44 Claims, 12 Drawing Sheets

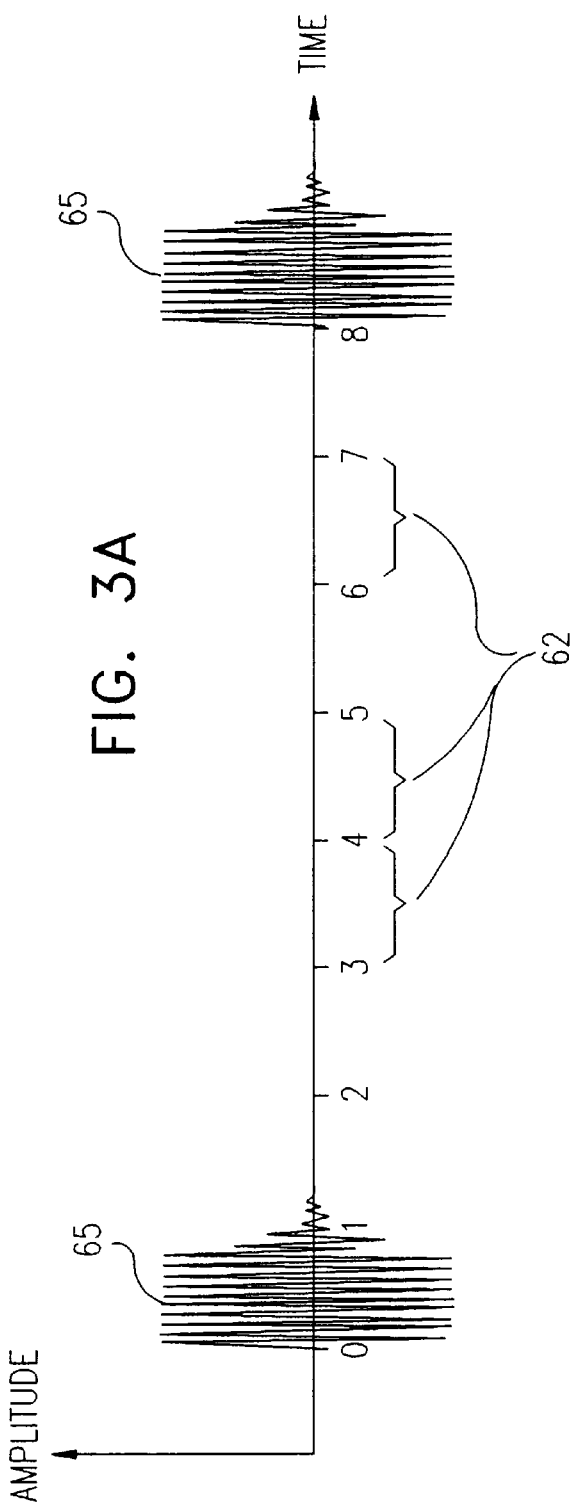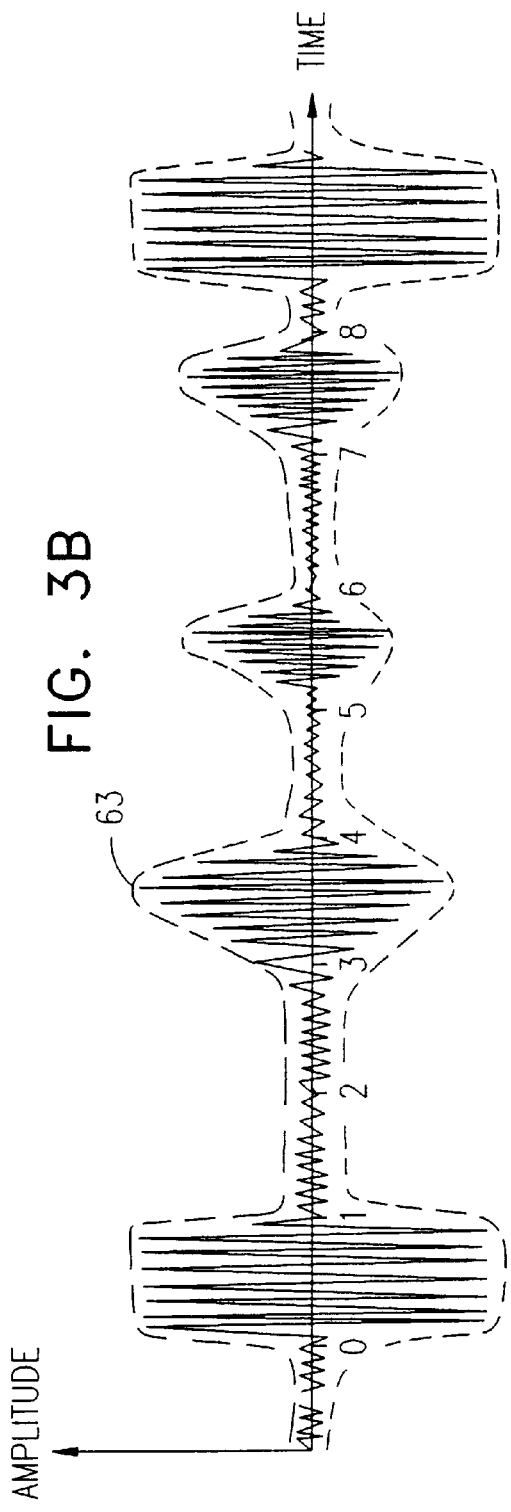

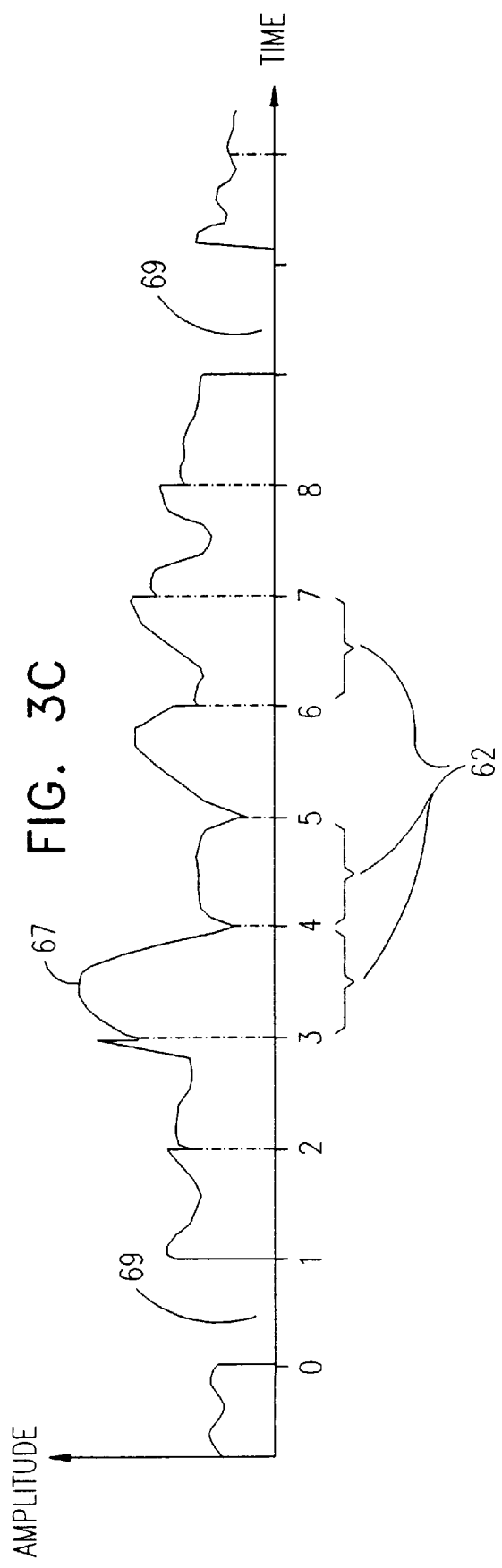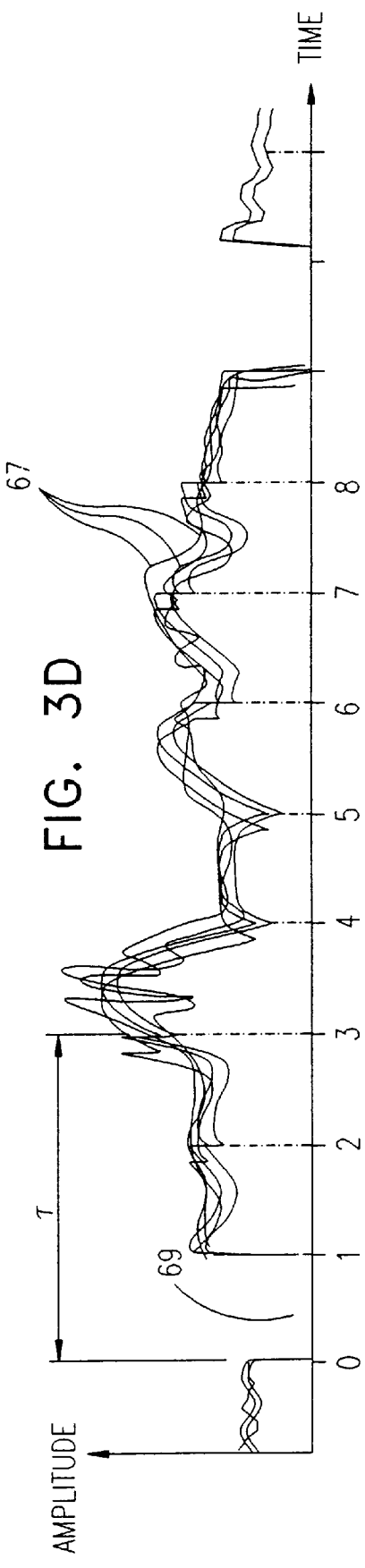

ULTRASOUND INTRUSION DETECTOR

FIELD OF THE INVENTION

The present invention relates generally to intrusion detectors and alarms, and specifically to ultrasound-based intrusion detection systems.

BACKGROUND OF THE INVENTION

Ultrasound-based intrusion detectors are well known in the art. Common detectors of this type simply sense and alarm on variations in constant ultrasonic wave fields that are incident thereon. Such variations are generally indicative of a motion within the detector's field of view. When the variation exceeds a preset threshold, the detector issues an alarm.

Simple ultrasound detectors of this type, however, are highly prone to false alarms due, for example, to air turbulence, detector vibration or swaying motion of inanimate objects. The detection threshold may be raised to reduce the false alarm rate, but generally at the expense of reduced detection efficiency. There is, therefore, a recognized need for more sophisticated ultrasound intrusion detectors, capable of discriminating between the actual movement of an intruder and sources of spurious disturbances in ultrasound signals.

U.S. Pat. No. 4,003,045, to Stockdale, which is incorporated herein by reference, describes an intrusion detection system with turbulence discrimination, based on the Doppler effect. Doppler ultrasound signals are received from an area under surveillance. Signals generated due to movement of an intruder in the area are assumed to produce a relatively constant Doppler shift, dependent on the velocity of the intruder's movement, whereas those due to turbulence have a generally random Doppler profile. A threshold is set in the system so as to discriminate against such randomly-shifted signals.

U.S. Pat. Nos. 4,035,798 and 4,319,349, to Hackett, which are incorporated herein by reference, describe intrusion detection systems, based on the Doppler effect, using modulated ultrasound transmitters. In the '798 patent, the transmitter is modulated by keying it on and off at a controlled modulation frequency. In the '349 patent, the frequency of the transmitter is modulated between two frequencies offset above and below a reference frequency. In both patents, Doppler echoes that are received from the detection area of the system are identified by virtue of their being modulated at the same frequency as the transmitted ultrasound radiation. The modulation may be useful in discriminating against spurious Doppler signals due, for example, to a telephone bell ringing in the vicinity of a detector, but not against other types of disturbances, such as Doppler echoes from swaying objects.

A further problem of ultrasound detection systems is that interfering signals may reach the detector from objects outside a distance range of interest. Thus, for example, U.S. Pat. No. 4,910,717, to Terry, which is incorporated herein by reference, describes apparatus for measuring distances to objects using pulsed ultrasound signals. The apparatus includes circuitry for eliminating spurious echoes from objects outside a desired distance range by setting a threshold signal level and by timing the interval between the transmission of an acoustic signal and the receipt of an echo signal from an object, so that echoes from objects outside the range are ignored.

Similarly, U.S. Pat. No. 4,755,973, to Meier et al., which is also incorporated herein by reference, describes a space surveillance system including one or more ultrasonic sources. Each source defines the area of a monitored space, dependent generally on the dimensions and ultrasonic wavelength of the source. A foreign object within the area triggers an alarm, and the system discriminates between objects within the area and those outside. The sources may be driven in either continuous or pulsed mode and at constant or modulated frequency.

U.K. patent application GB 2,115,151A, to Excell et al., which is incorporated herein by reference, describes a Doppler ultrasound movement detection system, for use particularly in safeguarding a selected area that is not bounded by walls. A transmitter sends periodic bursts of ultrasonic signals into the area, and a receiver receives ultrasonic signals reflected from objects in the area. The phases of the transmitted and reflected signals are compared to provide a reference signal. Doppler components in the reference signal are indicative of motion in the detection area, and successive reference signals are compared to control an alarm. The reference signals are gated so that reflections from outside the selected area are disregarded.

SUMMARY OF THE INVENTION

It is an object of the present invention to provide an improved ultrasound intrusion detector that detects the movement of an intruder within a detection area.

In some aspects of the present invention, the intrusion detector distinguishes between the movement of the intruder and spurious motion of objects in the area, particularly continuous and/or repetitive motion, such as swaying motion or the rotation of a fan. Although intrusion detection systems known in the art, as described above, may be capable of discriminating against random motion, they cannot generally distinguish between intruder movement and continuous or repetitive motion of objects within the area.

In other aspects of the present invention, the intrusion detector measures and tracks the distance of the intruder from the detector.

In preferred embodiments of the present invention, an intrusion detection system comprises an ultrasound transmitter/receiver, as is known in the art. The transmitter/receiver is driven by a controller to transmit an ultrasound pulse burst toward a detection area. After the burst is transmitted, the transmitter/receiver receives reflected ultrasound signals from the area for a predetermined period of time. The received signals are, preferably, amplified by a time-varying gain, which is adjusted for every time interval following the pulse burst to compensate for varying input signal levels and to prevent signal saturation due to strong ultrasound reflections. The amplified signals are digitized and then sampled, binned and stored according to their times of arrival at the transmitter/receiver. Each bin thus corresponds to signals received from a different range of distances traversed by the reflected ultrasonic waves.

The binned signals are processed to detect the motion of an intruder within the detection area. Bins corresponding to distance ranges outside the area are rejected. The sampled signals values in each bin within the range are, preferably, integrated and are used to determine difference values, indicative of a change over time of the signal values in that bin. The difference values are preferably filtered to eliminate frequencies outside a frequency range of interest, typically between 1 and 6 Hz. If the difference values for a given bin exceed a predetermined threshold over a predetermined number of ultrasound bursts, an intrusion condition is detected and, preferably, an alarm is generated. Thus, it will be understood that the ultrasound signals are analyzed to detect changes in an overall acoustic energy picture of the detection area. Unlike systems known in the art, preferred embodiments of the present invention do not depend on the Doppler effect to detect intruders in the detection area.

In the system described herein, signals due to repetitive motion at a generally fixed distance from the transmitter/receiver will be sampled and stored in the same bin for each ultrasound pulse burst. On the other hand, signals due to an intruder moving through the area will be sampled and stored generally in different bins from burst to burst, since the intruder characteristically moves from one part of the area to another, rather than moving repetitively in place. Thus, the system distinguishes between the repetitive signals and the intruder signals, so that false alarms due to the repetitive motion are substantially reduced or eliminated. Furthermore, by appropriate adjustment of the threshold and the bounds of the frequency range, as described above, the system may also be made resistant to false alarms due to random motion, air turbulence, moving curtains, noises and motion of small animals, for example. It will be appreciated that other signal processing circuits and methods, as are known in the art, may be used in conjunction with the system described herein to further reduce the incidence of such false alarms.

In some preferred embodiments of the present invention, a difference signal, corresponding to the differences between the sampled and stored signals, is determined over a plurality of pulse bursts. A frequency spectrum of the difference signal is calculated, for example, by Fast Fourier Transform (FFT), as is known in the art. When the amplitude of the spectrum within a spectral range of interest, preferably the range 1–6 Hz, as mentioned above, exceeds a predetermined threshold, an intrusion condition is detected. Excursions of the spectrum outside the range of interest are considered to be spurious, occurring as the result of air turbulence or foreign objects in the detection area, and are neglected.

In some preferred embodiments of the present invention, when the sampled signal values in a first one of the bins are found to have changed relative to the stored values in that bin from the preceding pulse burst, the sampled values in the first bin are then also compared with the stored values in neighboring bins. These neighboring bins correspond to distance ranges that are incrementally greater than or less than the distance of the first bin. By finding which of the neighboring bins has stored values closest to the sampled values in the first bin, motion of the intruder toward or away from the transmitter/receiver is detected and tracked.

In some preferred embodiments of the present invention, a plurality of ultrasound transmitter/receivers, or alternatively, one or more transmitters or transmitter/receivers and one or more additional receivers, are positioned adjacent to a detection area. The transmitters or transmitter/receivers are driven, and signals received therefrom and/or from the additional receivers are processed as described above. The one or more transmitters or transmitter/receivers and the additional receivers are used together, in accordance with the principles of the present invention described above, to determine and, preferably, to track in two or three dimensions the position of an intruder within the detection area.

It will be appreciated that although some preferred embodiments of the present invention are described with reference to a transmitter/receiver, which combines the functions of transmitting and receiving ultrasound waves, the principles of the present invention may equally be applied to intrusion detection systems using separate transmitter and receiver elements, as are known in the art.

There is therefore provided, in accordance with a preferred embodiment of the present invention, a method for detecting the presence of a moving object in a detection area, including:

emitting a sequence of bursts of ultrasonic energy into the area;

receiving ultrasonic energy reflected from within the detection area, in response to the sequence of bursts, and generating a sequence of signals respectively responsive thereto;

comparing each signal in the sequence with a preceding signal, to find a variation in the signals over the sequence of bursts; and analyzing the variation in the signals to determine the presence of the moving object.

Preferably, comparing each signal with the preceding signal includes sampling values of the signals and comparing the sampled values as a function of delay time between emitting the burst and receiving the energy, wherein comparing the sampled values includes finding a sequence of differences between successive sampled values at a given delay time in the sequence of bursts, and wherein analyzing the variation in the signals includes finding a difference signal by processing the sequence of differences.

Preferably, processing the sequence of differences includes applying a bandpass filter to the sequence, preferably passing frequencies substantially between 1 and 6 Hz.

Preferably, analyzing the variation in the signals includes indicating when the difference signal exceeds a predetermined threshold.

Additionally or alternatively, analyzing the variation in the signals includes determining a rate of change of the sampled values compared at a selected delay time, and preferably indicating when the rate of change exceeds a predetermined threshold.

Further additionally or alternatively, analyzing the variation in the signals includes determining a spectrum of the sampled values compared at a selected delay time over the sequence of bursts, and preferably indicating when a spectral amplitude exceeds a predetermined threshold. Preferably, indicating when the spectral amplitude exceeds the predetermined threshold includes indicating when a spectral amplitude within a spectral range of interest, most preferably in a range substantially between 1 and 6 Hz, exceeds the threshold.

In a preferred embodiment of the present invention, the method includes finding the delay time at which the threshold is exceeded, and determining the distance to the moving object based on the delay time.

Preferably, comparing the sampled values as a function of delay time includes comparing the sampled value of one of the signals in the sequence at a first delay time with the sampled value of the preceding signal at a second delay time, incrementally different from the first delay time, to determine a change in the distance to the object.

Preferably, emitting the bursts of ultrasonic energy includes emitting bursts having respective durations between 1 and 5 msec, and damping the bursts at the conclusion of the emission thereof.

Further preferably, receiving ultrasonic energy includes switching on an input amplifier after emitting each of the bursts.

In a preferred embodiment of the present invention, generating the sequence of signals includes generating a time-varying reference voltage and applying the voltage in digitizing the signals. Preferably, generating the time-varying reference voltage includes generating the voltage responsive to a measurement of reflected ultrasonic energy received following a burst of ultrasonic energy, substantially in the absence of moving objects within the detection area.

In another preferred embodiment, generating the sequence of signals includes determining a time-varying gain factor and applying the gain factor to amplify the signals received responsive to each burst. Preferably, determining the gain factor includes determining a time-varying gain factor responsive to a measurement of reflected ultrasonic energy received following a previous burst in the sequence, most preferably from generally stationary objects within the detection area.

In a preferred embodiment of the present invention, receiving ultrasonic energy includes receiving energy at multiple ultrasonic receivers, and processing the signals includes jointly processing signals generated by the multiple receivers to determine the position of the object in the detection area. Preferably, receiving energy at the multiple ultrasonic receivers includes receiving energy at two receivers having mutually-angled detection axes. Further preferably, jointly processing the signals includes comparing the signals to determine an angular coordinate of the moving object. Most preferably, receiving energy at the two receivers includes receiving energy at two receivers whose detection axes are substantially at right angles, and comparing the signals includes finding a trigonometric function of a quotient of the signals.

There is further provided, in accordance with a preferred embodiment of the present invention, apparatus for detecting the presence of a moving object in a detection area, including:
  an ultrasound transmitter, which emits a sequence of bursts of ultrasonic energy into the detection area;
  an ultrasound receiver, which receives ultrasonic energy reflected from the detection area, and generates a sequence of signals, corresponding to the sequence of bursts, responsive to the ultrasonic energy received; and
  a controller, which receives the signals generated by the receiver, compares each signal in the sequence with a preceding signal to find a variation in the signals over the sequence of bursts, and analyzes the variation to determine the presence of the moving object.

Preferably, the ultrasound transmitter and receiver together include a single ultrasound transducer, which both transmits and receives ultrasound energy.

Further preferably, the controller samples the signal values, determines a sequence of differences of the sampled values between each signal and the preceding signal, and filters the sequence of differences, most preferably through a pass band of approximately 1–6 Hz.

Preferably, the controller samples the signal values and determines a rate of change of the sampled values between each signal and the preceding signal. Additionally or alternatively, the controller determines a spectrum of the sampled values.

Preferably, the controller drives the transmitter to emit the bursts of ultrasonic energy. Further preferably, a damper is controlled by the controller to damp the transmitter after the bursts of ultrasonic energy are emitted.

Preferably, the apparatus includes a switched input amplifier, which is switched on by the controller to amplify the signals generated by the receiver.

Alternatively or additionally, the apparatus includes a gain-controlled amplifier, which is controlled by the controller to amplify the signals generated by the receiver with a time-varying gain.

Preferably, the apparatus includes an A/D converter, which digitizes the signals generated by the receiver, and a reference voltage generator, which is controlled by the controller to generate a time-varying reference voltage, which is applied to the A/D converter.

In a preferred embodiment of the present invention, the ultrasound receiver includes a first ultrasound receiver having a first detection axis, and a second ultrasound receiver, having a second detection axis, which is angled with respect to the first detection axis, preferably at a right angle therewith, wherein the controller receives and processes signals generated by the second receiver together with the signals received from the first receiver to determine the position of the object in the detection area. Preferably, the controller computes a trigonometric function of the signals received from the first and second receivers to determine an angular coordinate of the object.

The present invention will be more fully understood from the following detailed description of the preferred embodiments thereof, taken together with the drawings in which:

BRIEF DESCRIPTION OF THE DRAWINGS

FIG. 3A schematically illustrates signals transmitted by the system shown in FIG. 1, in accordance with a preferred embodiment of the present invention;

FIG. 3B schematically illustrates signals received by the system shown in FIG. 1, in response to the transmitted signals of FIG. 3A;

FIGS. 3C, 3D and 3E schematically illustrate successive stages in the processing of the signals received by the system shown in FIG. 1, as illustrated in FIG. 3B, in accordance with a preferred embodiment of the present invention;

DETAILED DESCRIPTION OF PREFERRED EMBODIMENTS

Figure 1:
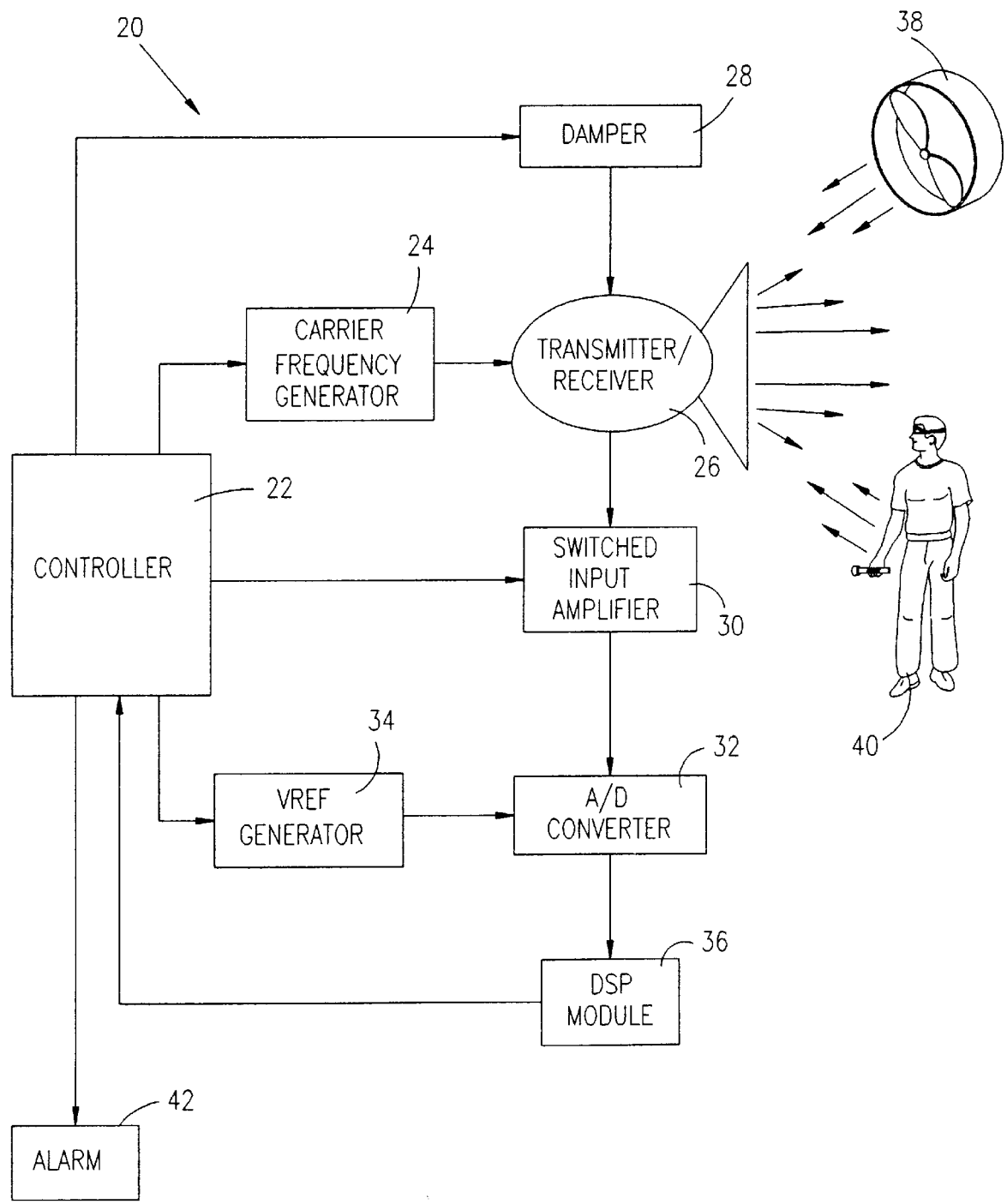
FIG. 1 is a block diagram schematically illustrating elements of an ultrasound intrusion detection system, in accordance with a preferred embodiment of the present invention.

Reference is now made to FIG. 1, which is a block diagram, schematically illustrating an ultrasound intrusion detection system 20, in accordance with a preferred embodiment of the present invention. System 20 comprises a controller 22, which triggers a carrier frequency generator 24 to produce short pulse bursts that drive an ultrasound transmitter/receiver 26. These bursts are preferably at a frequency between 16 and 40 kHz, most preferably around 25 kHz, and of a duration between 1 and 5 msec.

In response to the pulse bursts, transmitter/receiver 26 emits bursts of ultrasonic energy toward an area under surveillance, typically a closed area, such as a room in a home, shop, office or other building. Objects within the surveyed area, such as a fan 38 and an intruder 40, reflect some of the ultrasonic energy back toward transmitter/receiver 26 (as well as in other directions). These reflections continue as the ultrasonic energy burst propagates through the detection area, generally until the energy is damped out in the air.

After generator 24 has finished its pulse burst, a damper 28 is switched on briefly to damp mechanical self-vibrations of transmitter/receiver 26. An input amplifier 30 is then switched on to receive and amplify signals from the transmitter/receiver, generated in response to the reflected ultrasonic energy. The amplified signals are digitized by an A/D converter 32, to which a reference voltage generator 34 applies a voltage $V_{REF}$, controlled by controller 22. After each pulse burst, $V_{REF}$ is reset to an initial value and then varies over time according to a predetermined functional form, generally dependent on the ultrasonic reflections received by the transmitter/receiver. Thus the digitized signals, at the output of A/D converter 32, are maintained within a substantially constant range.

Preferably, the functional form of $V_{REF}$ is determined in advance by measuring the reflected ultrasonic energy received by transmitter/receiver 26 as a function of time following a pulse burst, generally in the absence of moving objects within the detection area, so that when $V_{REF}$ is applied, it will compensate for strong sound reflections that may be received from certain points in the detection area. The form of $V_{REF}$ is then preferably set to correspond generally to an amplitude envelope of the reflected energy (as illustrated below, for example, by envelope 63, shown in FIG. 3B). This form will typically correspond, at least in part, to the regular, monotonic decrease in the reflected ultrasonic energy that normally results from air damping of the ultrasonic burst. If there are particularly strong reflections from the detection area back to the transmitter/receiver at one or more particular times following the pulse burst, however, the form of $V_{REF}$ may also include increasing segments corresponding to these reflection.

The digitized signals are received by a digital signal processing (DSP) module 36, which samples the signals at a preferably constant sampling frequency, and groups the samples into time bins. Each successive bin contains samples received within a given, successive time interval, corresponding to signals generated due to reflections of the ultrasonic burst from objects at a given, respective distance from the transmitter/receiver. The samples in each bin are, preferably, summed together to produce integrated signal values, which values are then passed to controller 22. Alternatively, a single sample from each bin may be passed on for processing. The controller measures changes in the sampled signal values in each bin, from one burst to the next, as described below. These changes are used to determine a difference signal for each bin, corresponding to the change of the signal values in the bin over time. This difference signal is band-pass filtered, preferably with a pass band of about 1–6 Hz, although the limits of the pass band may be varied to adjust for different detection conditions. Such filtering is useful in reducing random noise and false alarms due to spurious motion in system 20.

When the filtered difference signal for any bin exceeds a predetermined threshold over a predetermined period of time, due, for example, to movement of intruder 40, controller 22 triggers an alarm 42. The alarm preferably comprises an audio alarm, but may, additionally or alternatively, comprise a visual alarm or any other type of alarm signal known in the art.

Figure 2:
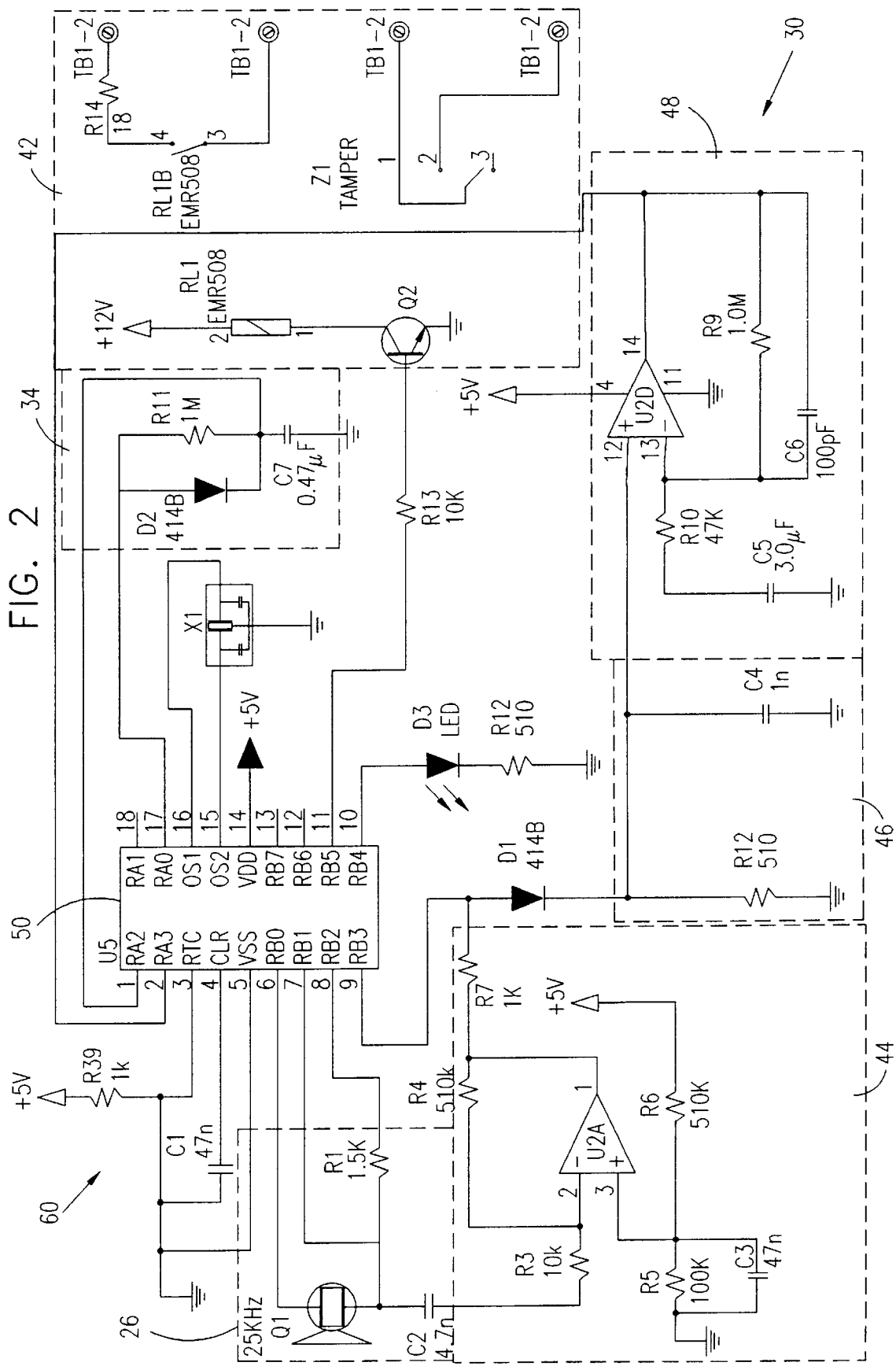
FIG. 2 is a circuit diagram, schematically illustrating elements of the system shown in FIG. 1, in accordance with a preferred embodiment of the present invention.

FIG. 2 is an electrical circuit diagram, schematically illustrating a circuit 60 for performing the functions of system 20, in accordance with a preferred embodiment of the present invention. Circuit 60 includes a microcontroller 50, preferably a PIC16C71 microcontroller, produced by MicroChip Technology Inc. of Chandler, Ariz., which includes internal analog/digital circuitry. Microcontroller 50 performs the combined functions of controller 22, carrier frequency generator 24 (in conjunction with crystal oscillator X1), damper 28, and DSP 36, as illustrated in FIG. 1.

Microcontroller 50 is coupled to drive transmitter/receiver 26, which preferably comprises a C25-18K ultrasound transmitter/receiver, produced by Nippon Ceramic Ltd. of Japan. Switched amplifier 30, which receives signals from transmitter/receiver 26, preferably comprises three stages: a preamplifier 44, a peak detector 46 and an output amplifier 48. The output of amplifier 48 is coupled to microcontroller 50, which digitizes and processes the output signals, as described herein, and triggers alarm output 42 when an intrusion is detected. Other elements of circuit 60 shown in FIG. 2, as well as an accompanying +5/+12 VDC power supply, not shown in the figure, will be clearly understood by those skilled in the art, without further explanation.

Figure 3E:
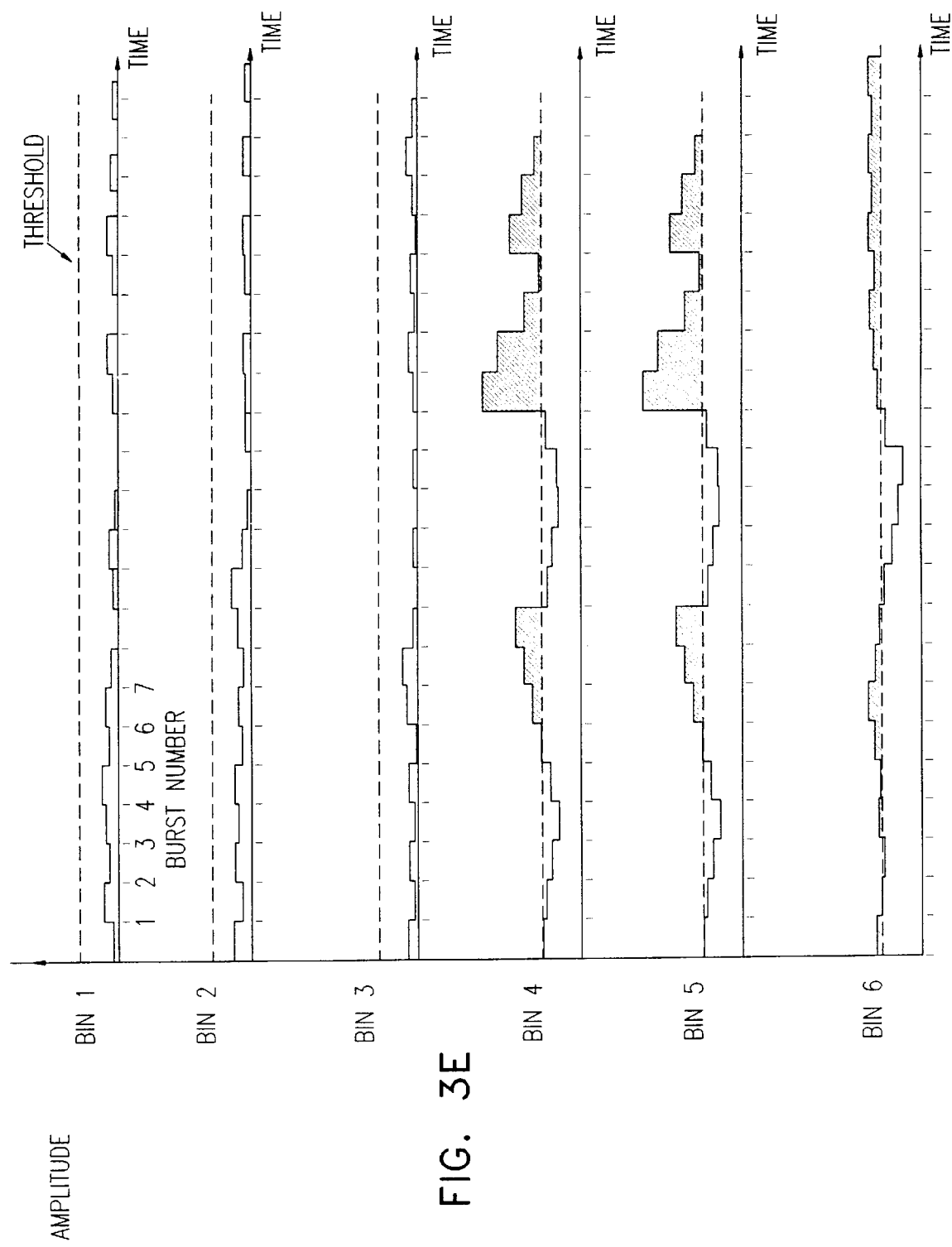

FIGS. 3A–3E show a series of graphs that schematically illustrate variations in the amplitudes of signals in system 20 as a function of time, in accordance with a preferred embodiment of the present invention. The units of amplitude and time on the vertical and horizontal axes, respectively, are arbitrary. The tick marks on the horizontal axes of FIGS. 3A–3D represent divisions between time bins 62, as described below, which may be typically taken to represent approximately 5 msec intervals. The tick marks on the horizontal axes of FIG. 3E represent burst numbers, each corresponding to a certain distance from the receiver, also described below.

As described below, the method underlying FIGS. 3A–3E is based on the principle of establishing a "sound picture" of acoustic wave interference in a detection area during a short period following each of a series of ultrasound bursts. If there is no moving intruder in the detection area, each of the acoustic "pictures" will change only slowly in relation to its predecessor. When intruder 40 enters the detection area, there will be a change in the acoustic picture. The change due to any moving object will generally be band-restricted to a certain part of the frequency spectrum of the picture, dependent on the size, position, speed and manner of motion of the object. The change will be observed at transmitter/receiver 26 at a time following the ultrasound burst that corresponds to the distance of the intruder from the transmitter/receiver.

Thus, the change in the acoustic picture due to the human intruder is preferably detected by analyzing signals received by transmitter/receiver 26 within a predetermined, characteristic frequency range, which has been found to be responsive to the movement of a person, typically about 1–6 Hz. Substantial changes of the acoustic picture within this range are generally caused by large moving objects (such as intruder 40), but not by smaller objects, such as domestic animals, or stationary, repetitively-moving objects, such as fan 38. Thus, by activating alarm 42 only in response to changes within the predetermined range, the incidence of false alarms may be substantially reduced.

FIG. 3A represents the amplitude of ultrasound energy bursts 65 emitted by transmitter/receiver 26 in response to pulses received from frequency generator 24. After a pulse duration of about 5 msec, damper 28 damps transmitter/receiver 26, so that the burst ceases.

FIG. 3B shows the amplitude of signals generated by transmitter/receiver 26 in response to ultrasonic energy reflected from the detection area, including reflections from moving objects, such as intruder 40. The signals are typically bounded by a low-frequency envelope 63.

As shown in FIG. 3C, the signal of FIG. 3B is filtered and amplified to produce a smoothed, amplitude-adjusted envelope signal 67. The signal is divided into time bins 62, each bin corresponding to a time range or, equivalently, a distance range from transmitter/receiver 26. In a first bin 69, corresponding in time with transmitted burst 65, the amplitude of signal 67 is zeroed, preferably by switching off input amplifier 30. In the remaining bins, the amplitude of signal 63 is adjusted responsive to the reference voltage $V_{REF}$, as described above, to produce the adjusted signal 67. This adjustment may be performed either digitally, preferably by applying $V_{REF}$ to A/D converter 32, or by controlling the signal gain in an analog stage, before digitizing the signal, preferably using a gain-controlled amplifier, such as amplifier 84, shown in FIGS. 5A and 5B below.

In FIG. 3D, several successive traces of signal 67 are superimposed, each trace representing the signals received following a respective, successive ultrasonic burst 65. The signals shown in this graph are processed, as described above, to bin the signal values and compare the integrated value in each bin with that in the same bin in the preceding trace, so as to determine a difference signal for each bin. The difference signals are bandpass-filtered, preferably using digital filtering with a 1–6 Hz pass band, as described above.

FIG. 3E shows the filtered difference signals as a function of time for each of bins 62. The time axis in FIG. 3E is compressed relative to that in FIGS. 3A–3D, since each tick mark in FIG. 3E represents a new burst 65 (corresponding to about eight tick marks in FIGS. 3A–3D).

In the example shown in these figures, for time bins 1, 2 and 3, up to a time τ, shown in FIG. 3D, the filtered difference signals are less than a predetermined threshold, indicating that there is no significant object movement within the corresponding range of distances from transmitter/receiver 26. For time bins 4 and up, beyond time τ, however, the signals exceeds the threshold, indicating the presence of a moving object. In response to this high difference signal, controller 22 activates alarm 42.

The difference signals shown in FIG. 3E are characteristic of signals engendered by an object moving through a distance from transmitter/receiver 26 corresponding to bin 4. The supra-threshold difference signals in bins 5 and 6, corresponding to greater distances from the transmitter/receiver are typically the result of echoes from the object, reaching the transmitter/receiver at later times. Additional bins at later times, relative to burst 65, than those shown in FIG. 3E are beyond a range of interest, and suprathreshold difference signals in such bins do not cause alarm 42 to be activated.

Figure 4:
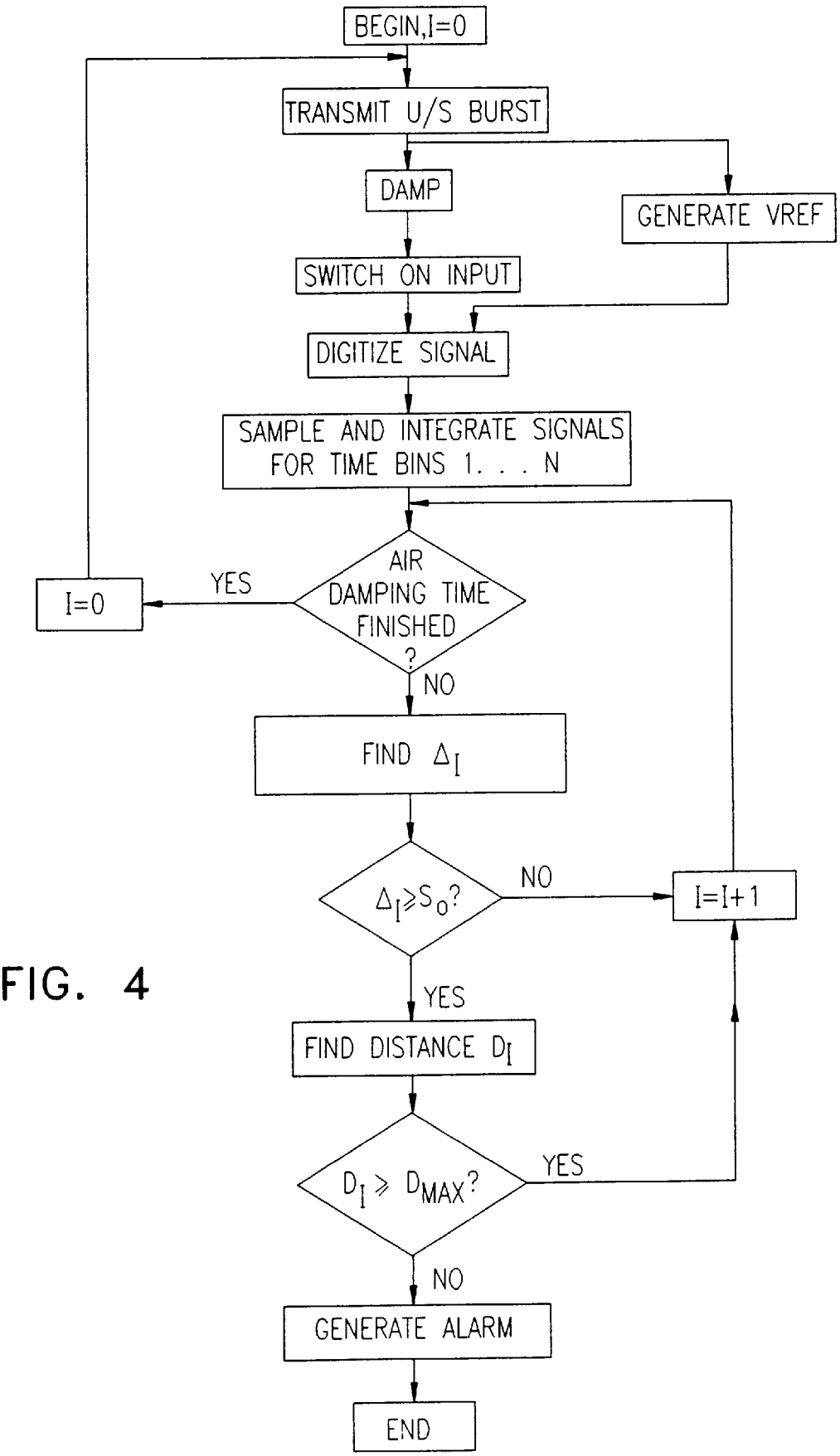
FIG. 4 is a flow chart, schematically illustrating operation of the system shown in FIG. 1, in accordance with a preferred embodiment of the present invention.

FIG. 4 is a flow chart that schematically illustrates the operation of system 20, in accordance with a preferred embodiment of the present invention. Specifically, FIG. 4 exemplifies methods described herein for determining whether an intruder is moving in the detection area. The initial steps in the method include transmitting the ultrasonic burst, damping transmitter/receiver 26, switching on amplifier 30 while generating $V_{REF}$, and digitizing the signals, as described above. The digitized signals are sampled, sorted into bins indexed from 1 to N, and integrated. This process continues after each ultrasonic burst for a duration generally equal to the air damping time.

For each sample bin I, from I=1 to I=N, the integrated signal value is compared with the value from the preceding ultrasonic burst, and the difference signal $\Delta_I$, is computed and filtered. If $\Delta_I$, is greater than or equal to a threshold value $S_O$, then the distance $D_I$ from transmitter/receiver 26 corresponding to bin I is determined or checked. If $D_I$ is less than $D_{MAX}$, the maximum dimension of the detection area, then the supra-threshold difference signal $\Delta_I$, in bin I is taken to indicate that an intruder has moved in the area, and alarm 42 is triggered. In any other event, the entire process is repeated.

Both rotating fan 38 and moving intruder 40 will cause changes in the ultrasound signals received by transmitter/receiver 26 from burst to burst. The signals due to intruder 40 moving through the detection area will have a relatively high rate of change from burst to burst, causing $\Delta_I$, to exceed the threshold value, and alarm 42 to be triggered. It will be appreciated, however, that the continuous motion of fan 38 at a substantially stationary location will cause the integrated signal value in the bin corresponding to the distance of the fan from transmitter/receiver 26 to have only a small, sub-threshold difference signal $\Delta_I$, which will not cause alarm 42 to be triggered. Preferably, the difference signals in each bin are smoothed or averaged over time, so that random or transient increases in Δ will not trigger the alarm.

Alternatively or additionally, for each sample bin I, the difference signal, corresponding to the differences between the current and the preceding signal values, is determined over a plurality of pulse bursts. A frequency spectrum of the difference signal for each bin is calculated, for example, by Fast Fourier Transform (FFT). When the spectral amplitude within a spectral range of interest, preferably the range 1–6 Hz, exceeds a predetermined threshold in one or more of the bins, an intruder is determined to be present, and alarm 42 is triggered. Outside the spectral range of interest, however, increases in the spectral amplitude are considered to be spurious. For example, an increase in the amplitude at 100 Hz is assumed to be due to a foreign object in the detection area, and is neglected.

It will be appreciated that, unlike system 20, intrusion detection systems known in the art are generally incapable of distinguishing between the motion of intruder 40 and fan 38. Furthermore, by appropriate adjustment of threshold level $S_O$ and by the use of other signal processing methods, known in the art, system 20 may also be made resistant to false alarms due to random motion, air turbulence, noises, moving curtains and motion of small animals, for example.

In some preferred embodiments of the present invention, system 20 also tracks the distance of intruder 38 from transmitter/receiver 26. When the sampled signal values in one of the bins, say bin K, are found to have changed relative to the stored values in that bin at a rate $\Delta_K$ exceeding the threshold, the sampled values in bin K are then also compared with the stored values in bins K−1 and K+1, and possibly with bins K−2, K+2, etc. Bins K−1 and K+1 correspond to distance ranges that are respectively incrementally less than and greater than the distance of the first bin. By finding which of the neighboring bins has stored values closest to the sampled values in bin K, motion of the intruder toward or away from the transmitter/receiver may be detected and tracked.

Figure 5A:
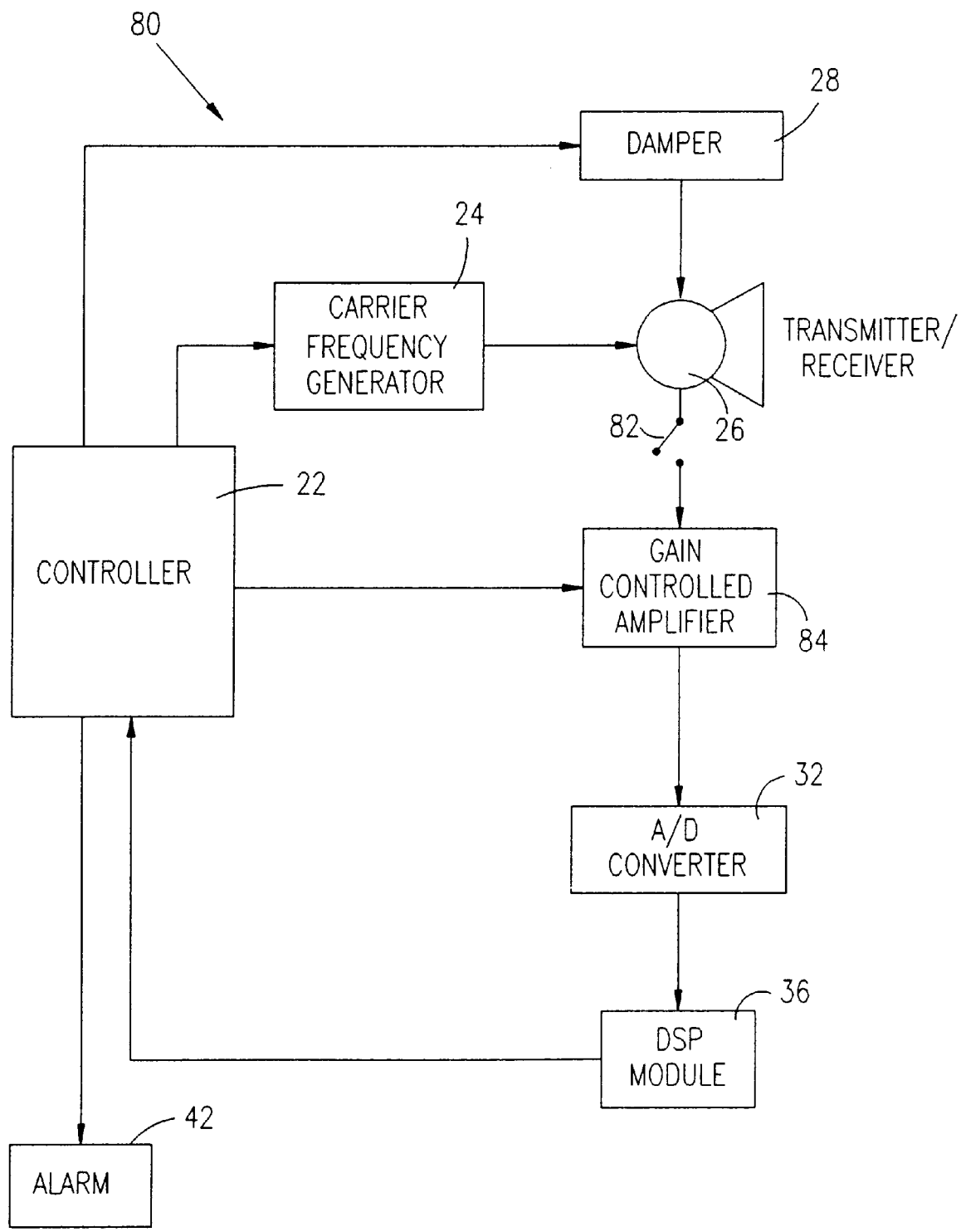
FIGS. 5A and 5B are block diagrams schematically illustrating elements of ultrasound intrusion detection systems, in accordance with alternative preferred embodiments of the present invention.

Reference is now made to FIG. 5A, which is a block diagram schematically illustrating another ultrasound intrusion detection system 80, in accordance with an alternative preferred embodiment of the present invention. Most of the elements of system 80 are closely similar to those of system 20, shown in FIG. 1 and described with reference thereto, and only the differences between these two systems will be described here. System 80 includes a gain controlled amplifier 84, which is regulated by controller 22 to apply a variable gain to signals generated by transmitter/receiver 26. An analog switch 82 closes the connection between the transmitter/receiver and the amplifier after damper 28 has damped the self-vibration of the transmitter/receiver, at the conclusion of each ultrasound pulse burst emitted thereby.

The variable gain applied to gain controlled amplifier 84 in system 80 serves substantially the same purpose as the variable reference voltage $V_{REF}$ applied to A/D converter 32 in system 20, as described above. It compensates for variations in the amplitude of the ultrasound signal due to air damping, as well as due to strong background reflections from the detection area, as illustrated, for example, in FIG. 3C. The gain variation following each pulse burst is preferably preset in response to ultrasound reflection conditions in the detection area, but it may alternatively be adjusted adaptively by controller 22 from burst to burst.

Figure 5B:
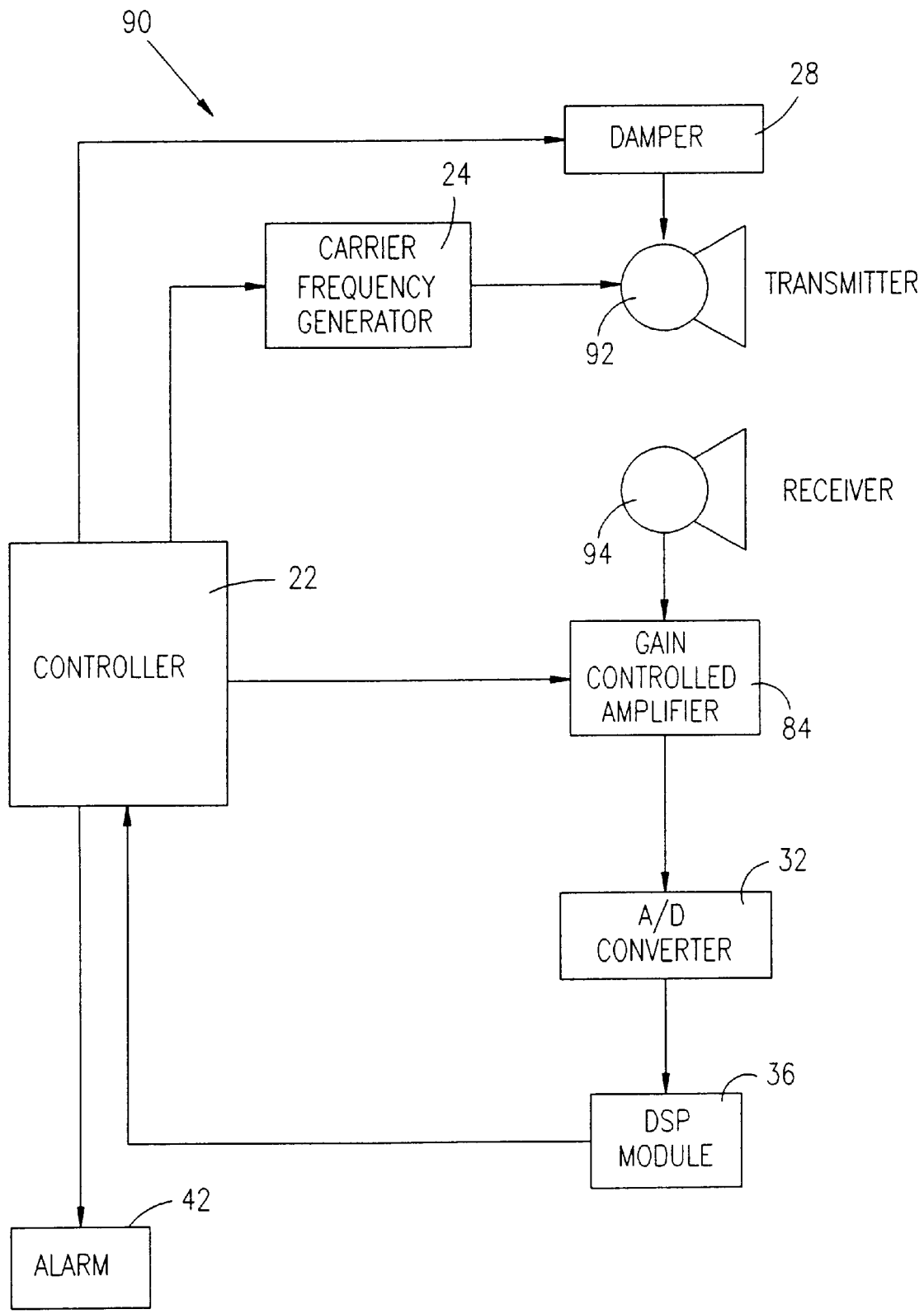

FIG. 5B is a block diagram that schematically illustrates yet another alarm system 90, in accordance with another preferred embodiment of the present invention. System 90 is substantially similar to system 80, shown in FIG. 5A, except that system 90 includes a separate ultrasound transmitter 92 and a receiver 94. The separation of the transmitter and the receiver alleviates the problem of self-vibrations of the transmitter/receiver reaching amplifier 84, so that analog switch 82 is no longer required. It will be appreciated that substantially all the embodiments and features of the present invention described herein with reference to an integral transmitter/receiver unit, such as transmitter/receiver 26, may similarly be realized using separate transmitter and receiver units.

Figure 6:
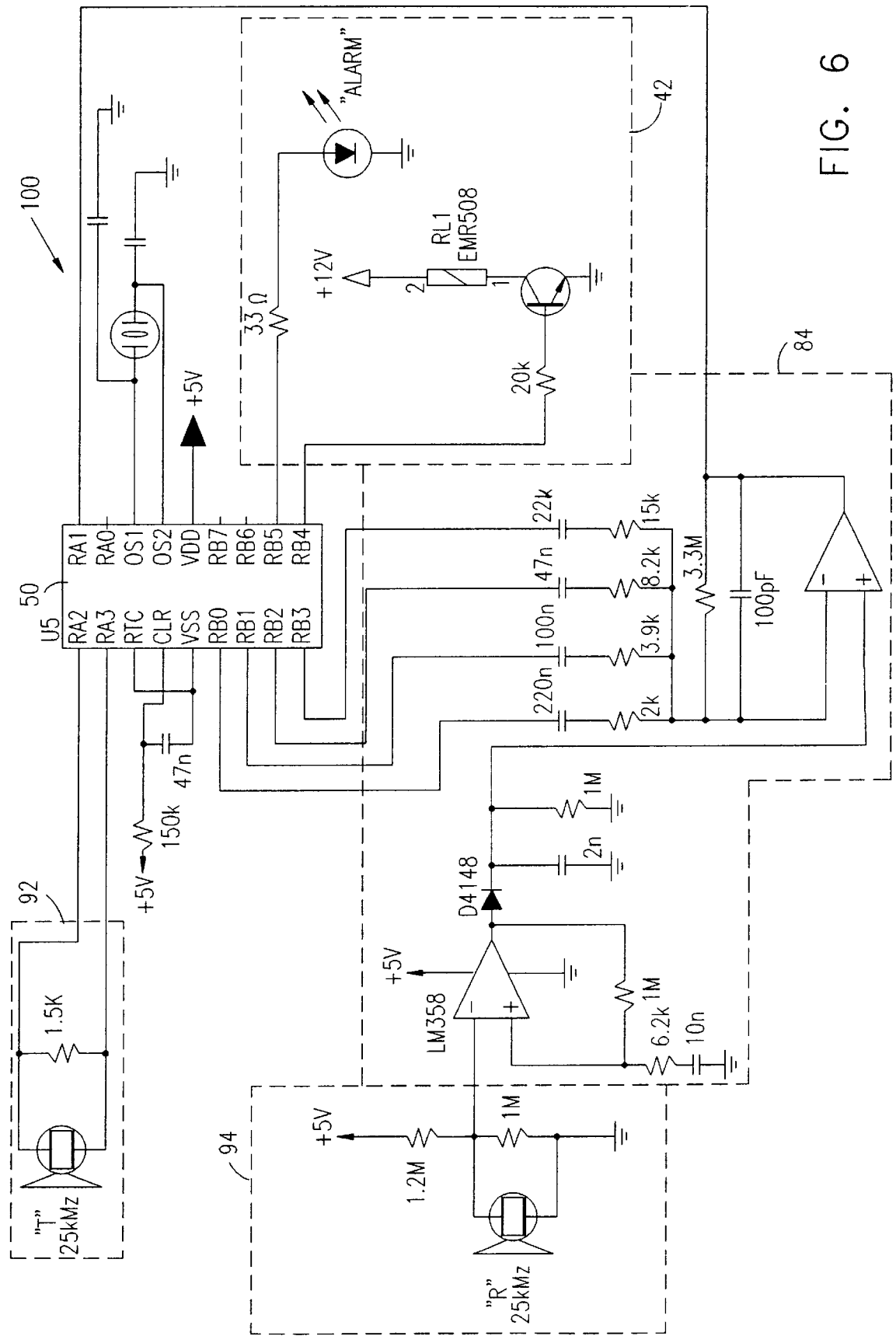
FIG. 6 is a circuit diagram, schematically illustrating elements of the system shown in FIG. 5B, in accordance with a preferred embodiment of the present invention.

FIG. 6 is an electrical circuit diagram, schematically illustrating a circuit 100 for performing the functions of system 90, in accordance with a preferred embodiment of the present invention. Circuit 100 is similar in design and operation to circuit 60, shown in FIG. 2, and is likewise based on microcontroller 50. Microcontroller 50 is coupled to drive transmitter 92 and to receive and digitize signals from receiver 94, after these signals have been amplified by gain-controlled amplifier 84. The transmitter and receiver preferably comprise C25-18K ultrasound transmitter/ receivers, as described above. Outputs $RB_O$ through $RB_3$ are coupled to control the gain of amplifier 84. When microcontroller 50 detects difference signals above the predetermined threshold, as described above, it triggers alarm 42.

Figure 7:
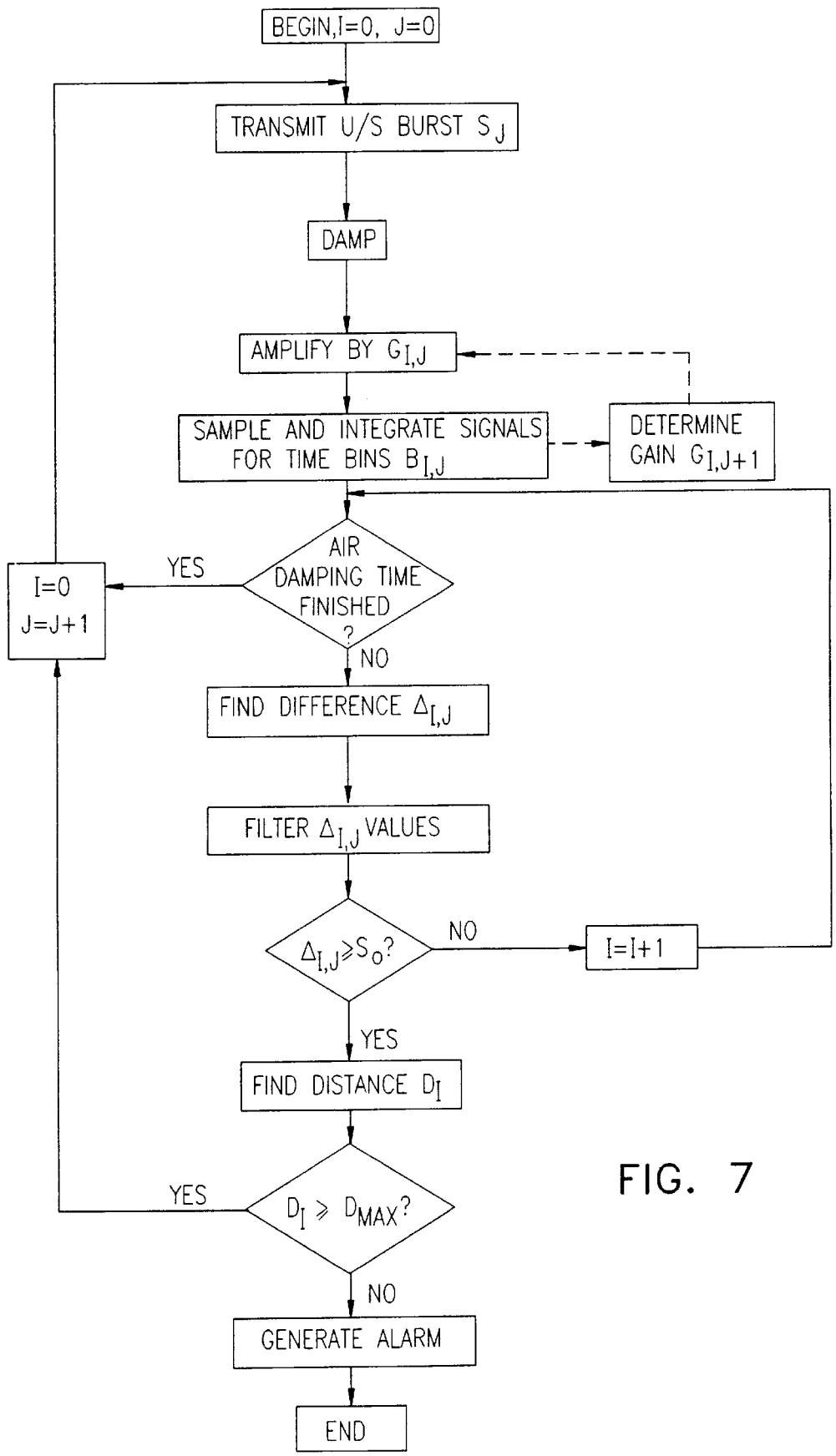
FIG. 7 is a flow chart, schematically illustrating operation of the system shown in FIG. 5B, in accordance with a preferred embodiment of the present invention.

FIG. 7 is a flow chart that schematically illustrates the operation of system 90, in accordance with a preferred embodiment of the present invention, similar to that illustrated in FIGS. 3 and 4 and described with reference thereto. In FIG. 7, index J refers to the sequence of ultrasound pulses emitted by transmitter 92, and index I refers to the sequence of bins into which the signals received by receiver 94 are divided. Signals received in each bin I after each burst J are amplified by amplifier 84 with a bin gain factor $G_{I,J}$. For each burst J, this gain factor is determined dynamically, based on the sampled and integrated signal value in bin I from the preceding burst or from a sequence of such bursts, as described above. The signals are sampled and integrated bin-by-bin after each burst J until a predetermined time, typically dictated by the air damping time, has elapsed.

For each bin I, a difference signal $\Delta_{I,J}$ is determined by taking the difference between the current sampled, integrated signal value in bin I and the signal value in bin I from the previous, J−1, burst. The sequence of difference signals for successive bursts J is filtered, preferably with a pass band of 1–6 Hz, as described above, and the filtered difference signal is compared to a threshold $S_O$. If $\Delta_{I,J}$ exceeds the threshold for some bin I, and the distance $D_I$ from receiver 94 associated with bin I is within a predetermined maximum distance range $D_{MAX}$ associated with a detection area of system 90, then alarm 42 is activated. Otherwise the entire process is repeated.

Figure 8:
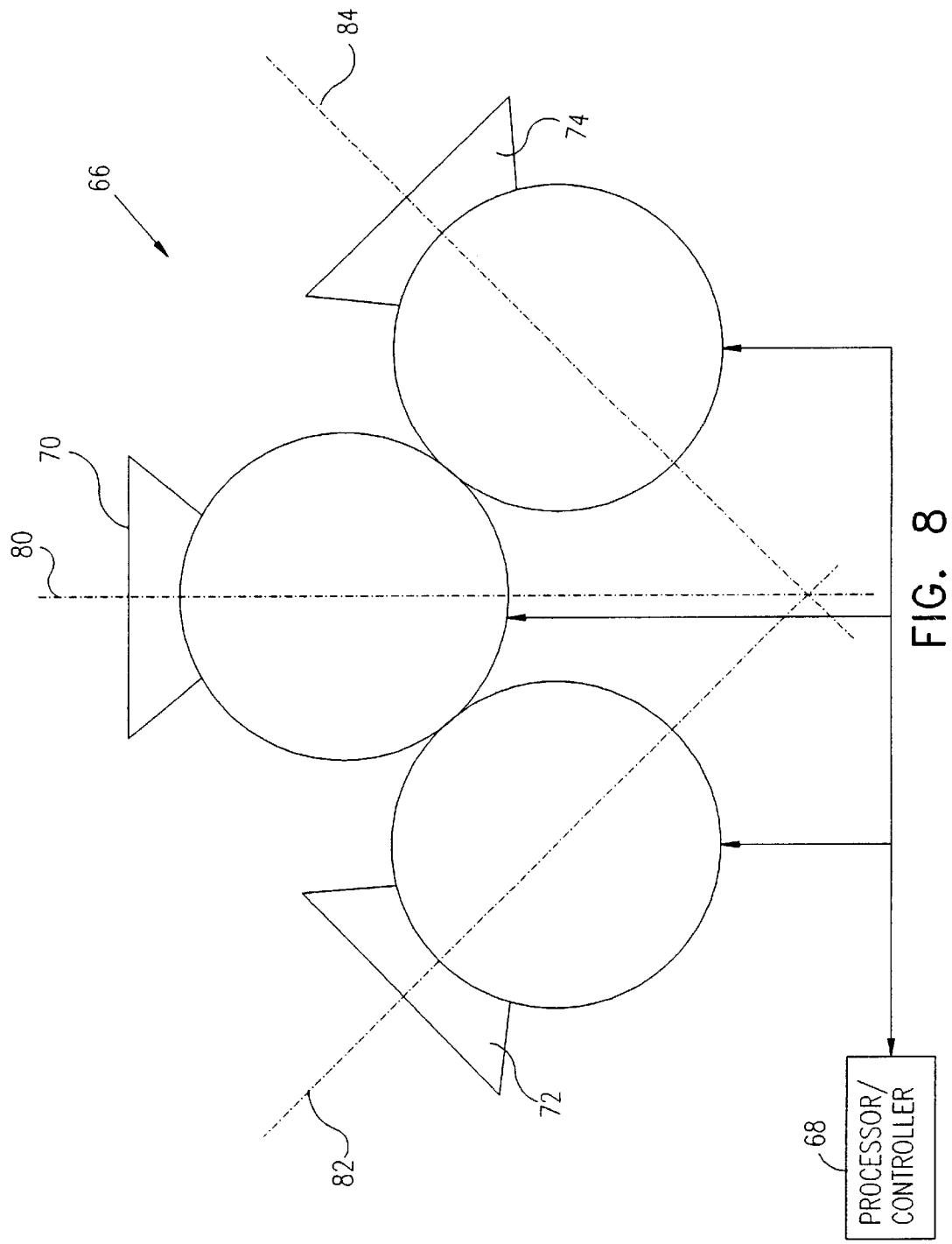
FIG. 8 is a schematic illustration of an ultrasound intrusion detection system including a transmitter and two receivers, in accordance with another preferred embodiment of the present invention.

FIG. 8 is a schematic illustration of an intrusion detection system 66 including an ultrasound transmitter 70 and two ultrasound receivers 72 and 74, similar to the transmitters and receivers described above. A processing and control unit 68 drives transmitter 70 and receives and processes signals from receivers 72 and 74, substantially as described above with regard to system 90, shown in FIG. 5B. Transmitter 70 and receivers 72 and 74 have respective transmission axes 80, 82 and 84, which are mutually angled, preferably such that axes 82 and 84 generally form a right angle, with axis 80 generally bisecting the angle.

Figure 9A:
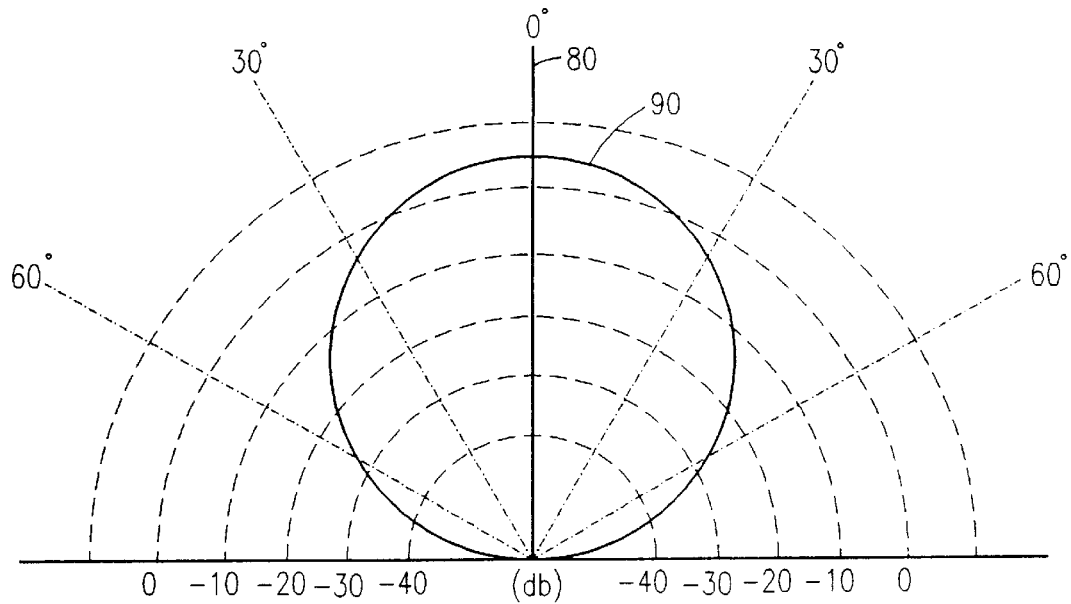
FIG. 9A is a graph illustrating schematically a transducer angular direction characteristic, applicable to the transmitter and receivers of FIG. 8, in accordance with a preferred embodiment of the present invention.

FIG. 9A is a graph schematically showing an angular directional response characteristic 90 of transmitter 70, which is also applicable to receivers 72 and 74. Such graphs are well known in the art, and ultrasound transducers are designed and produced with various different characteristics of this sort. The response graph shown in FIG. 9A applies, for example, to transmitter model T25-18 and receiver model R25-18, made by Nippon Ceramic Ltd., although other transducers, known in the art, may also be used for this purpose. It will be observed that response characteristic 90 may generally be modeled mathematically as a cosine function of the polar angle with respect to axis 80.

Figure 9B:
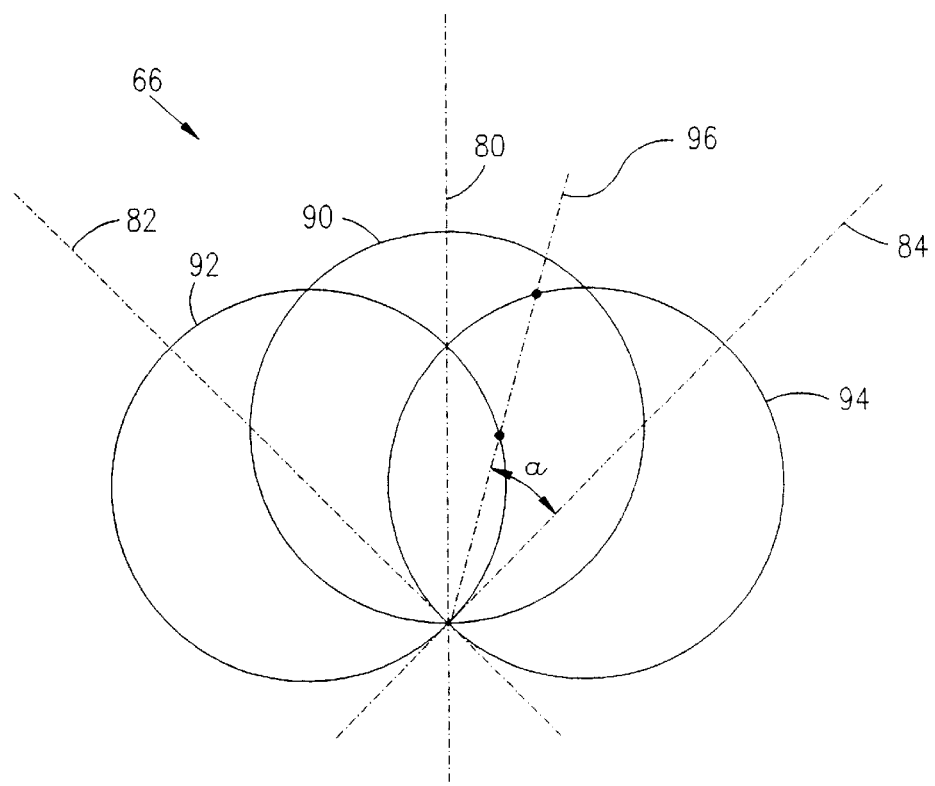
FIG. 9B schematically illustrates the combined angular direction characteristics of the transmitter and receivers of FIG. 8, in accordance with a preferred embodiment of the present invention.

FIG. 9B is a graph schematically illustrating overlapping response characteristics 90, 92 and 94 of detector 70 and receivers 72 and 74, respectively, as shown in FIG. 8, based on the graph of FIG. 9A. When an intruder enters the detection area of system 66, processor/control unit 68 will detect the movement of the intruder and will preferably track the intruder's distance from receivers 72 and 74 by distance-binning of the receiver signals, as described above. Furthermore, by comparing the signals received from the two receivers, unit 68 will also be able to determine and track the intruder's lateral position, in the following manner:

Based on response characteristic 90 described above, the response signal of receiver 74 to the intruder may generally be modeled as:

$$S_1 = k R_0 \cos \alpha \quad (1)$$

wherein $\alpha$ is the angle between axis 84 and an axis 96, along which the intruder is assumed to be found; $R_o$ is a factor responsive to the distance of the intruder from the receivers; and k is a proportionality factor of the system. The response signal of receiver 72 may similarly be modeled as $$S_2 = kR_0 \sin \alpha \quad (2)$$

Thus, unit 68 can determine the angular coordinate of the intruder from the quotient of the response signals:

$$\alpha \cong \arctan\left(\frac{S_2}{S_1}\right). \quad (3)$$

In other preferred embodiments of the present invention, not shown in the figures, a greater number of ultrasound transmitter/receivers may be used, as described above, to track an intruder's movement over a greater detection area and/or with greater accuracy. By suitably positioning the transmitter/receivers, the intruder's movement may even be tracked in three dimensions, rather than only two. Alternatively, a position-tracking intrusion detection system in accordance with the principles of the present invention may comprise one or more ultrasound transmitter/receivers or transmitters, together with additional ultrasound receivers, which receive ultrasonic energy due to reflections of the ultrasonic energy bursts transmitted by the transmitters.

It will be appreciated that the preferred embodiments described above are cited by way of example, and the full scope of the invention is limited only by the claims.

We claim:

1. A method for detecting the presence of a moving object in a detection area, comprising:

emitting a sequence of bursts of ultrasonic energy into the area;

receiving ultrasonic energy reflected from within the detection area, in response to the sequence of bursts, and generating a sequence of signals respectively responsive thereto;

comparing each signal in the sequence with a preceding signal, to find a variation in the signals over the sequence of bursts; and analyzing the variation in the signals to determine the presence of the moving object, wherein comparing each signal with the preceding signal comprises sampling values of the signals and comparing the sampled values as a function of delay time between emitting the burst and receiving the energy and analyzing the variation in the signals comprises determining a rate of change of the sampled values compared at a selected delay time.

2. A method according to claim 1, wherein comparing the sampled values comprises finding a sequence of differences between successive sampled values at a given delay time in the sequence of bursts, and wherein analyzing the variation in the signals comprises finding a difference signal by processing the sequence of differences.

3. A method according to claim 2, wherein analyzing the variation in the signals comprises indicating when the difference signal exceeds a predetermined threshold.

4. A method according to claim 2, wherein processing the sequence of differences comprises applying a bandpass filter to the sequence.

5. A method according to claim 4, wherein applying the bandpass filter comprises passing frequencies substantially between 1 and 6 Hz.

6. A method according to claim 3 and comprising finding the delay time at which the threshold is exceeded, and determining the distance to the moving object based on the delay time.

7. A method according to claim 1, wherein analyzing the variation in the signals comprises indicating when the rate of change exceeds a predetermined threshold.

8. A method according to claim 7 and comprising finding the delay time at which the threshold is exceeded, and determining the distance to the moving object based on the delay time.

9. A method according to claim 1, wherein analyzing the variation in the signals comprises determining a spectrum of the sampled values compared at a selected delay time over the sequence of bursts.

10. A method according to claim 9, wherein analyzing the variation in the signals comprises indicating when a spectral amplitude exceeds a predetermined threshold.

11. A method according to claim 10 and comprising finding the delay time at which the threshold is exceeded, and determining the distance to the moving object based on the delay time.

12. A method according to claim 10, wherein indicating when the spectral amplitude exceeds the predetermined threshold comprises indicating when a spectral amplitude within a spectral range of interest exceeds the threshold.

13. A method according to claim 12, wherein indicating when the spectral amplitude within the range of interest exceeds the threshold comprises indicating when a spectral amplitude in a range substantially between 1 and 6 Hz exceeds the threshold.

14. A method according to claim 1, wherein generating the sequence of signals comprises generating a time-varying reference voltage and applying the voltage in digitizing the signals.

15. A method according to claim 14, wherein generating the time-varying reference voltage comprises generating the voltage responsive to a measurement of reflected ultrasonic energy received following a burst of ultrasonic energy, substantially in the absence of moving objects within the detection area.

16. A method according to claim 1, wherein comparing the sampled values as a function of delay time comprises comparing the sampled value of one of the signals in the sequence at a first delay time with the sampled value of the preceding signal at a second delay time, incrementally different from the first delay time, to determine a change in the distance to the object.

17. A method according to claim 1, wherein emitting the bursts of ultrasonic energy comprises emitting bursts having respective durations between 1 and 5 msec.

18. A method according to claim 1, and comprising damping the bursts at the conclusion of the emission thereof.

19. A method according to claim 1, wherein receiving ultrasonic energy comprises switching on an input amplifier after emitting each of the bursts.

20. A method according to claim 1, wherein generating the sequence of signals comprises determining a time-varying gain factor and applying the gain factor to amplify the signals received responsive to each burst.

21. A method according to claim 20, wherein determining the gain factor comprises determining a gain factor responsive to a measurement of reflected ultrasonic energy from generally stationary objects within the detection area.

22. A method according to claim 20, wherein determining the gain factor comprises determining a time-varying gain factor responsive to a measurement of reflected ultrasonic energy received following a previous burst in the sequence.

23. A method according to claim 22, wherein determining the gain factor comprises determining a gain factor responsive to a measurement of reflected ultrasonic energy from generally stationary objects within the detection area.

24. A method according to claim 1, wherein receiving ultrasonic energy comprises receiving energy at multiple ultrasonic receivers, and wherein processing the signals comprises jointly processing signals generated by the multiple receivers to determine the position of the object in the detection area.

25. A method according to claim 24, wherein receiving energy at the multiple ultrasonic receivers comprises receiving energy at two receivers having mutually-angled detection axes.

26. A method according to claim 25, wherein jointly processing the signals comprises comparing the signals to determine an angular coordinate of the moving object.

27. A method according to claim 26, wherein receiving energy at the two receivers comprises receiving energy at two receivers whose detection axes are substantially at right angles, and wherein comparing the signals comprises finding a trigonometric function of a quotient of the signals.

28. Apparatus for detecting the presence of a moving object in a detection area, comprising:

an ultrasound transmitter, which emits a sequence of bursts of ultrasonic energy into the detection area;

an ultrasound receiver, which receives ultrasonic energy reflected from the detection area, and generates a sequence of signals, corresponding to the sequence of bursts, responsive to the ultrasonic energy received; and a controller, which receives the signals generated by the receiver, compares each signal in the sequence with a preceding signal to find a variation in the signals over the sequence of bursts and analyzes the variation to determine the presence of the moving object, wherein the controller samples the signal values and determines a rate of change of the sampled values between each signal and the preceding signal.

29. Apparatus according to claim 28, and comprising an A/D converter, which digitizes the signals generated by the receiver, and a reference voltage generator, which is controlled by the controller to generate a time-varying reference voltage, which is applied to the A/D converter.

30. Apparatus according to claim 28, and comprising a gain-controlled amplifier, which is controlled by the controller to amplify the signals generated by the receiver with a time-varying gain.

31. Apparatus according to claim 28, wherein the ultrasound transmitter and receiver together comprise a single ultrasound transducer, which both transmits and receives ultrasound energy.

32. Apparatus according to claim 31, wherein the controller samples the signal values and determines a spectrum of the sampled values.

33. Apparatus according to claim 31, wherein the controller samples the signal values, determines a sequence of differences of the sampled values between each signal and the preceding signal, and filters the sequence of differences.

34. Apparatus according to claim 31, wherein the controller filters the sequence through a pass band of approximately 1–6 Hz.

35. Apparatus according to claim 28, wherein the controller samples the signal values and determines a rate of change of the sampled values between each signal and the preceding signal.

36. Apparatus according to claim 28, wherein the controller samples the signal values, determines a sequence of differences of the sampled values between each signal and the preceding signal, and filters the sequence of differences.

37. Apparatus according to claim 28, wherein the controller samples the signal values and determines a spectrum of the sampled values.

38. Apparatus according to claim 28, and comprising a switched input amplifier, which is switched on by the controller to amplify the signals generated by the receiver.

39. Apparatus according to claim 28, wherein the controller drives the transmitter to emit the bursts of ultrasonic energy.

40. Apparatus according to claim 28, and comprising a damper, which is controlled by the controller to damp the transmitter after the bursts of ultrasonic energy are emitted.

41. Apparatus according to claim 28, wherein the ultrasound receiver comprises a first ultrasound receiver having a first detection axis, and comprising a second ultrasound receiver, having a second detection axis, which is angled with respect to the first detection axis, wherein the controller receives and processes signals generated by the second receiver together with the signals received from the first receiver to determine the position of the object in the detection area.

42. Apparatus according to claim 41, wherein the first and second detection axes are mutually angled generally at a right angle.

43. Apparatus according to claim 41, wherein the controller computes a trigonometric function of the signals received from the first and second receivers to determine an angular coordinate of the object.

44. Apparatus according to claim 43, wherein the first and second detection axes are mutually angled generally at a right angle.

* * * * *